United States Patent
Wang et al.

(10) Patent No.: US 9,612,875 B2
(45) Date of Patent: Apr. 4, 2017

(54) OPERATIONAL-TASK-ORIENTED SYSTEM AND METHOD FOR DYNAMICALLY ADJUSTING OPERATIONAL ENVIRONMENT

(71) Applicant: NATIONAL APPLIED RESEARCH LABORATORIES, Taipei (TW)

(72) Inventors: Ming-Jen Wang, Hsinchu (TW);
Chih-Wen Chang, Hsinchu (TW);
Chuan-Lin Lai, Hsinchu (TW);
Chia-Chen Kuo, Hsinchu (TW);
Jiang-Siang Lian, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 190 days.

(21) Appl. No.: 14/541,377

(22) Filed: Nov. 14, 2014

(65) Prior Publication Data
US 2016/0103705 A1    Apr. 14, 2016

(30) Foreign Application Priority Data

Oct. 14, 2014  (TW) .............................. 103135587 A

(51) Int. Cl.
*G06F 9/48*  (2006.01)
*G06F 9/50*  (2006.01)

(52) U.S. Cl.
CPC .......... *G06F 9/5061* (2013.01); *G06F 9/4856* (2013.01); *G06F 9/5005* (2013.01); *G06F 9/5027* (2013.01)

(58) Field of Classification Search
CPC .... G06F 9/4856; G06F 9/5005; G06F 9/5027; G06F 9/5061
See application file for complete search history.

(56) References Cited

U.S. PATENT DOCUMENTS

| | | | |
|---|---|---|---|
| 5,822,531 | A | 10/1998 | Gorczyca et al. |
| 2005/0228856 | A1* | 10/2005 | Swildens ................ G06F 9/50 709/200 |

(Continued)

FOREIGN PATENT DOCUMENTS

| | | |
|---|---|---|
| TW | 2013228255 A1 | 7/2013 |
| TW | 201342084 A | 10/2013 |
| TW | 201418995 A | 5/2014 |

*Primary Examiner* — Abdullah Al Kawsar
(74) *Attorney, Agent, or Firm* — Rosenberg, Klein & Lee

(57) ABSTRACT

The present invention provides an operational-task-oriented system and method for dynamically adjusting operational environment applicable to a computer cluster. Each operational node of the computer cluster has two or more operational systems installed. After receiving the operational task, the control node estimates the time required for completing different tasks requiring different operational systems by appropriate operational nodes and compares the estimated finish time and the assigned finish time for judging how to adjust the operating system running in the operational nodes. Thereby, the operational task can be completed in the assigned finish time. Another method is to use the control node to analyze the proportions of the tasks requiring different operational systems in an operational task and hence adjusts the operational system running in an operational node according to the proportion of requirement. Thereby, the operational task can be completed in the shortest time.

9 Claims, 5 Drawing Sheets

(56) References Cited

U.S. PATENT DOCUMENTS

| | | | |
|---|---|---|---|
| 2012/0005682 A1* | 1/2012 | Doyle | G06F 9/4881 718/102 |
| 2012/0079493 A1* | 3/2012 | Friedlander | G06F 9/5027 718/104 |
| 2015/0277987 A1* | 10/2015 | Di Balsamo | G06F 9/5083 718/104 |

* cited by examiner

OPERATIONAL-TASK-ORIENTED SYSTEM AND METHOD FOR DYNAMICALLY ADJUSTING OPERATIONAL ENVIRONMENT

FIELD OF THE INVENTION

The present invention relates generally to an operational-task-oriented system and method for dynamically adjusting operational environment, and particularly to dynamically adjusting the operational environment of the operational nodes in a computer cluster for accelerating completion of the scheduled operational tasks.

BACKGROUND OF THE INVENTION

As the technology of computer graphics develops, computer-produced images are becoming more vivid and delicate. In order to produce computer images with high subtlety and fidelity, massive computer operations are required. Consequently, the render farm is developed.

The render farm is a computer cluster, mainly used for executing massive image rendering tasks related to computer graphics. The computers at the nodes of the computer cluster can operate in close coordination for finishing enormous computation tasks.

Currently, the render software is diversified. While producing computer images, a user usually uses several kinds of render software. Different render software has different requirement in the operational system. Thereby, while producing computer images by mixing several kinds of render software and using the render farm, a simper way is to set up two or more render farms according to the number of the operational systems required by the render software. The render farms run different operational systems, respectively, for supporting the render software requiring different operational systems.

Nonetheless, by setting up two or more render farms, some problems occur, including difficulty in sharing resources among render farms, increased complexity in management (for example, inability in managing a unified schedule among render farms), and raised maintenance costs for software and hardware. Accordingly, by providing various operational systems or operational environments in different operational nodes of a render farm, respectively, resources can be shared among the operational nodes in the render farms as various kinds of render software are supported. This can not only reduce overall maintenance costs but also enhance the utility of the operational nodes in the render farm.

It is advantageous as described above to provide two or more operational systems or operational environments by using different operational nodes in the same render farm. Nonetheless, limited by the differences in the requirements of the operational systems or environments of different kinds of render software, it is difficult to support operational tasks reciprocally in different operational nodes having distinct operational systems or environments. As a consequence, the system manager generally needs to adjust the installation ratios of different operational systems or environments manually according to the operational task for accelerating the overall production results of the render farm.

Accordingly, the present invention provides a system and method for dynamically adjusting operational environment. Two or more operational systems are installed in each operational node in the computer cluster of the system. The control node can estimate the time required for completing different tasks requiring different operational systems, compare the estimated finish time and the assigned finish time, raise the proportion of the operational systems running in the operational nodes required by certain types of tasks having the estimated finish time exceeding the assigned finish time, or adjust the proportion of the operational systems running in the operational nodes according to different requirements of tasks in operational system for accelerating completion of the operational task.

SUMMARY

An objective of the present invention is to provide a system for dynamically adjusting operational environment. In each operational node of a computer cluster, two or more operational systems are installed. The control node can assign operational task to appropriate operational nodes and control respective operational node for altering the operational system running thereon and thus shortening the time required for the computer cluster to complete the overall operational task.

Another objective of the present invention is to provide a method for dynamically adjusting operational environment. The control node estimates the time required for completing different tasks requiring different operational systems by appropriate operational nodes and compares the estimated finish time and the assigned finish time for judging how to adjust the operating system running in the operational nodes. Thereby, the operational task can be completed in the assigned finish time.

A further objective of the present invention is to provide a method for dynamically adjusting operational environment. The control node analyzes the proportions of the tasks requiring different operational systems in an operational task and hence adjusts the operational system running in an operational node according to the proportion of requirement. Thereby, the operational task can be completed in the shortest time.

In order to achieve the above objectives and efficacy, the present invention discloses a system for dynamically adjusting operational environment applicable to a computer cluster, which comprises a control node, a plurality of operational nodes, and a storage node. The plurality of operational nodes are connected with the control node, respectively; the storage node is connected with the plurality of operational nodes, respectively. Each operational node includes a first operational system and a second operational system installed therein. The control node assigns at least a first-type task contained in an operational task to at least an operational node running the first operational system and at least a second-type task contained in the operational task to at least an operational node running the second operational system. Alternatively, the control node controls at least an operational node to restart for altering the first or second operational system running on the operational node. In addition, the storage node stores an operational result of the plurality of operational nodes after operating the plurality of first-type tasks or the plurality of second-type tasks, respectively.

The present invention further discloses a method for dynamically adjusting operational environment, which is applied to the computer cluster in the system for dynamically adjusting operational environment as described above. First, the control node receives the operational task. When the plurality of operational nodes include at least a idle operational node that is operating, the control node judges that idle operational node is running the first or second operational system, estimates an estimated finish time of first-type task, which is the time required by the idle operational node running the first operational system for operating the first-type task, and an estimated finish time of second-type tasks, which is the time required by the idle operational node running the second operational system for operating the second-type tasks, and compares the estimated finish time of first-type task, the estimated finish time of second-type task, and an assigned finish time of operational task.

When the estimate finish time of first-type task is greater than the assigned finish time of operational task and the estimate finish time of second-type task is less than the assigned finish time of operational task, the control node controls at least an idle operational node running the second operational system to restart, so that the idle operational node can be changed to run the first operational system. Contrarily, when the estimate finish time of second-type task is greater than the assigned finish time of operational task and the estimate finish time of first-type task is less than the assigned finish time of operational task, the control node controls at least an idle operational node running the first operational system to restart, so that the idle operational node can be changed to run the second operational system.

The present invention further discloses a method for dynamically adjusting operational environment, which is applied to the computer cluster in the system for dynamically adjusting operational environment as described above. First, the control node receives the operational task. It analyzes and estimates a time ratio of the first-type task in the operational task. When the plurality of operational nodes include a plurality of idle operational nodes not involved in operation, the control node estimates an operational-system ratio of at least an idle operational node running the first operational system in the plurality of idle operational nodes. Next, the control node compares the time ratio with the operational-system.

As the time ratio is greater than the operational-system ratio, the control node controls at least an idle operational node running the second operational system to restart in order to change the operational system running in the idle operational node to the first operational system. Contrarily, as the time ratio is less than the operational-system ratio, the control node controls at least an idle operational node running the first operational system to restart in order to change the operational system running in the idle operational node to the second operational system.

DETAILED DESCRIPTION

In order to make the structure and characteristics as well as the effectiveness of the present invention to be further understood and recognized, the detailed description of the present invention is provided as follows along with embodiments and accompanying figures.

The present invention provides an operational-task-oriented system and method for dynamically adjusting operational environment characterized in that they are applied to a single computer cluster and each operational node in the computer cluster has two or more operational systems installed. The control node can control individual operational node to change the operational system running thereon for shortening the time required by the computer cluster to complete the overall operational task. The control node can compare the time required for completing different tasks requiring different operational systems by appropriate operational nodes with the assigned finish time for judging how to adjust the operating system running in the operational nodes, so that the operational task can be completed in the assigned finish time. Alternatively, the control node can adjust the operational systems running in the operational nodes according to the proportion of tasks requiring different operational systems in the operational task. Thereby, the operational task can be completed in the shortest time.

Figure 1A:
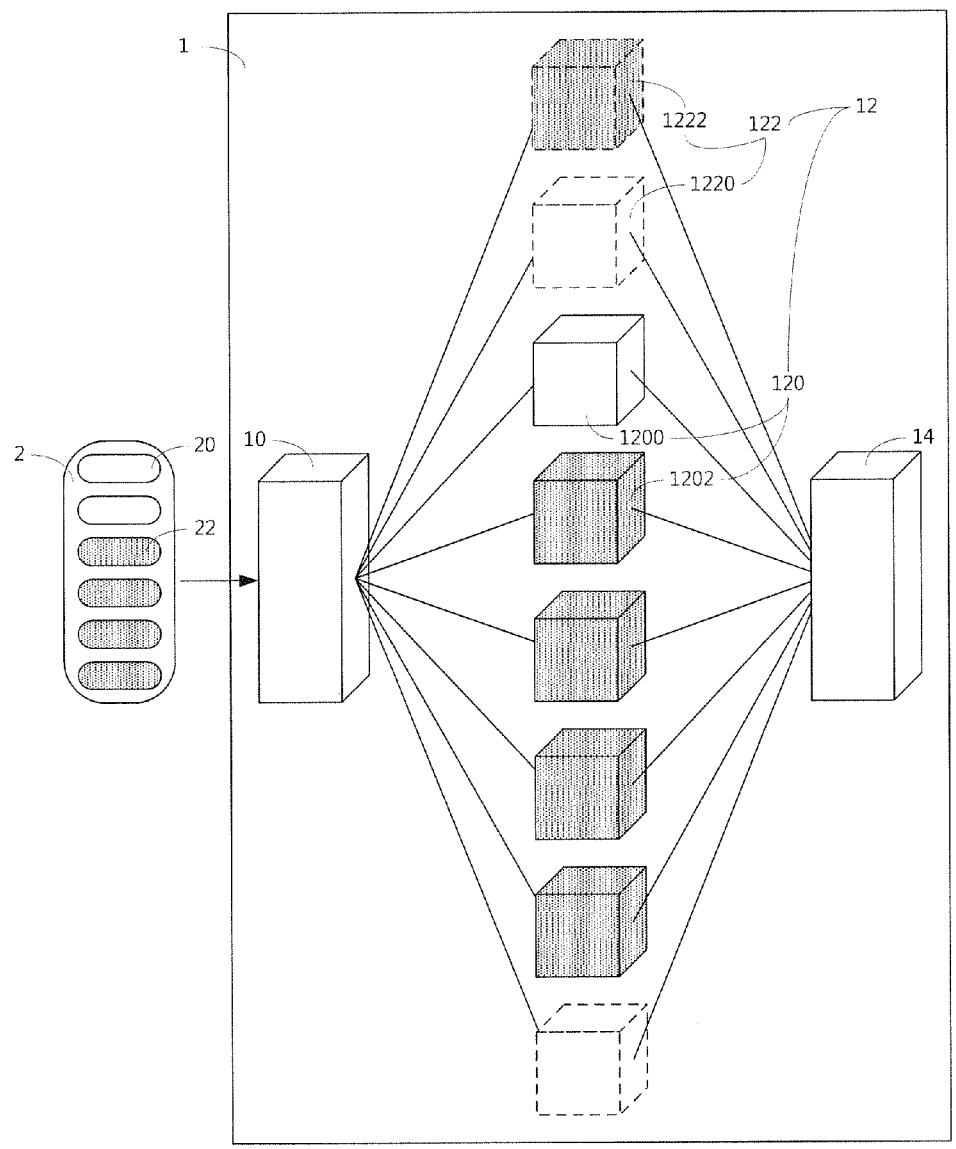
FIG. 1A shows a structural schematic diagram of the system according to a preferred embodiment of the present invention.
Figure 1B:
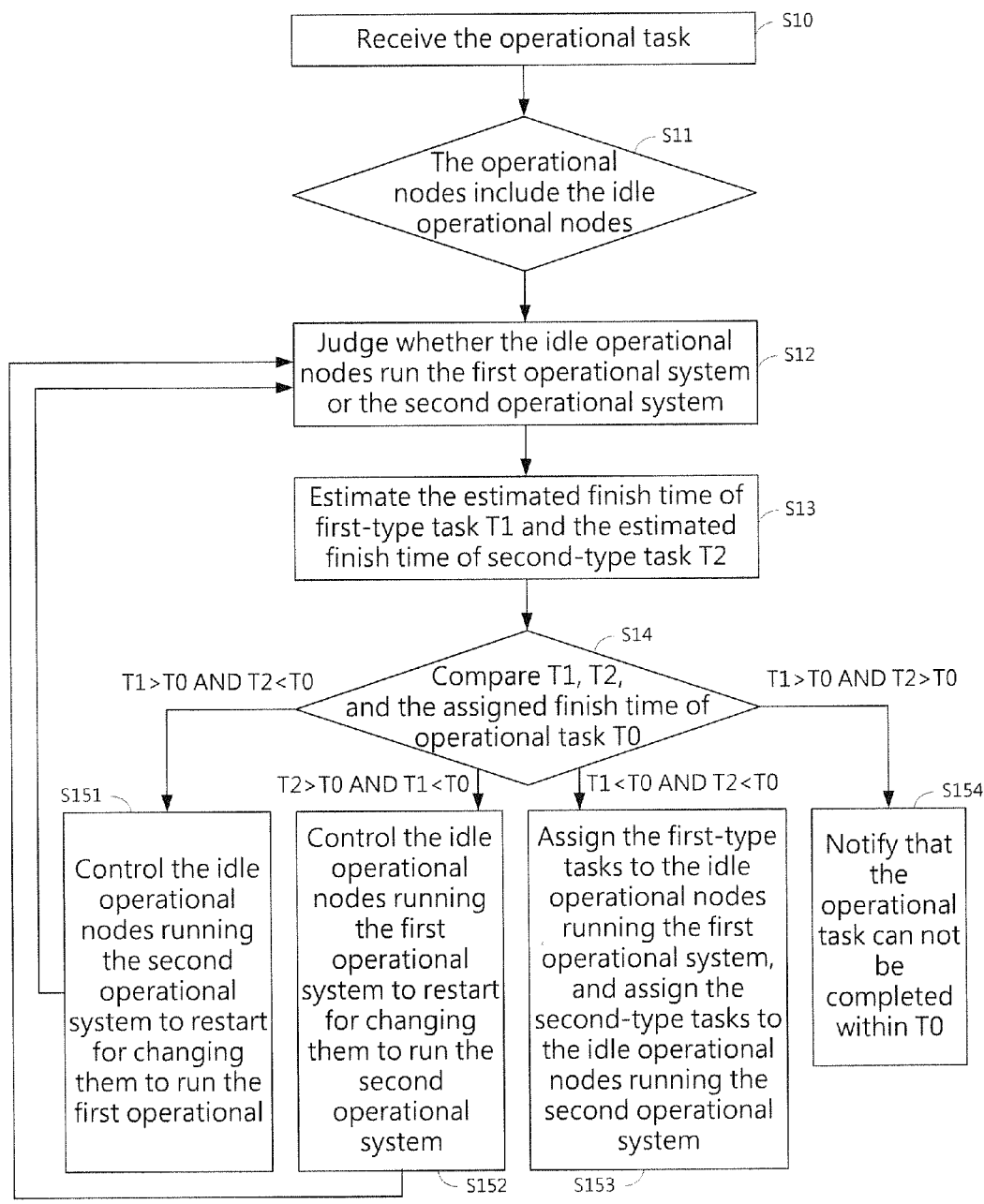
FIG. 1B shows a flowchart (1) of the method according to a preferred embodiment of the present invention.
Figure 1C:
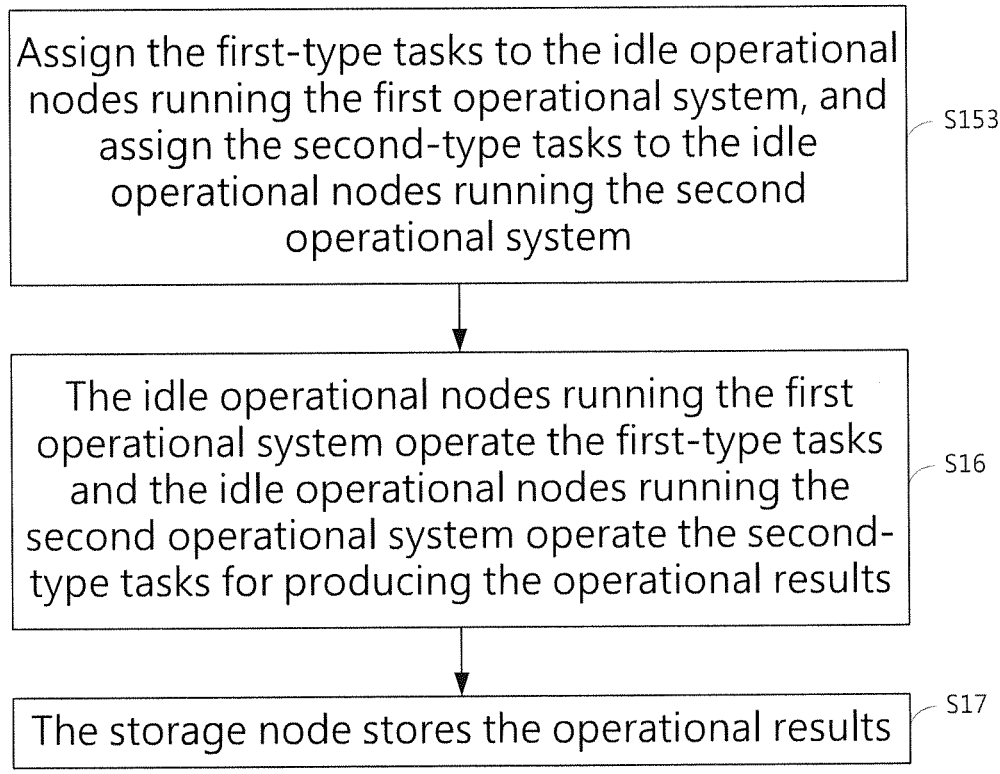
FIG. 1C shows a flowchart (2) of the method according to a preferred embodiment of the present invention.

Please refer to FIG. 1A, FIG. 1B, and FIG. 1C, which show a structural schematic diagram of the system and flowcharts (1), (2) of the method according to a preferred embodiment of the present invention. As shown in FIG. 1A, the system for dynamically adjusting operational environment according to the present invention is applied to a computer cluster 1, which comprises a control node 10, a plurality of operational node 12, and a storage node 14. The plurality of operational nodes 12 are connected with the control node 10, respectively; the storage node 14 is connected with the plurality of operational nodes 12, respectively.

The plurality of operational nodes 12 have a first operational system and a second operational system installed. In FIG. 1A, the plurality of operational nodes 12 represented in solid lines are busy operational nodes 120 performing operations. Among the plurality of busy operational nodes 120, the unmeshed ones are busy operational nodes 1200 running the first operational system; the meshed ones are busy operational nodes 1202 running the second operational system. The plurality of operational nodes 12 represented in dashed lines are idle operational nodes 122 not performing operations. Among the plurality of idle operational nodes 122, the unmeshed ones are idle operational nodes 1220 running the first operational system; the meshed ones are idle operational nodes 1222 running the second operational system.

The control node 10 receives an operational task 2, which comprises a plurality of first-type tasks 20 (represented by unmeshed rounded rectangles) and a plurality of second-type tasks 22 (represented by meshed rounded rectangles). The plurality of first-type tasks 20 need to be operated in the first operational system, while the second-type tasks 22 need to be operated in the second operational system. Thereby, the control node 10 can assign the plurality of first-type tasks 20 to the idle operational nodes 1220 running the first operational system and the plurality of second-type tasks 22 to the idle operational nodes 1222 running the second operational system.

In addition, the control node 10 can control the idle operational nodes 1220 running the first operational system to restart for changing their operational system to the second operational system. Alternatively, the control node 10 can control the idle operational nodes 1222 running the second operational system to restart for changing their operational system to the first operational system.

As shown in FIG. 1B, the method for dynamically adjusting operational environment according to the present invention is applied to the system for dynamically adjusting operational environment of FIG. 1A, and comprises the following main steps:

Step S10: Receive the operational task;
Step S11: The operational nodes include the idle operational nodes;
Step S12: Judge whether the idle operational nodes run the first operational system or the second operational system;
Step S13: Estimate the estimated finish time of first-type task and the estimated finish time of second-type task;
Step S14: Compare the estimated finish time of first-type task, the estimated finish time of second-type task, and the assigned finish time of operational task;
Step S151: Control the idle operational nodes running the second operational system to restart for changing them to run the first operational system; and
Step S152: Control the idle operational nodes running the first operational system to restart for changing them to run the second operational system.

In the step S10, the control node 10 receives the operational task 2. As described above, the operation task 2 includes the plurality of first-type tasks 20 operable in the first operational system and the plurality of second-type tasks 22 operable in the second operational system. Besides, the operational task 2 is assigned with an assigned finish time of operational task T0.

In the step S11, the control node 10 confirms if all of the operational nodes 12 in the computer cluster 1 contain any idle operational node 122. If not, the control node 10 waits until at least an operation node 12 in the plurality of operational nodes 12 competes its operation, which is then released and becomes the idle operational node 122. When the plurality of operational node 12 contains at least an idle operational node 122, the step S12 is performed.

In the step S12, the control node 10 judges which of the first and second operational systems is operating in the idle operational node(s) 122.

In the step S13, the control node 10 estimates an estimated finish time of first-type task T1, which is the time required by the idle operational nodes 1220 running the first operational system to complete the first-type tasks, and an estimated finish time of second-type task T2, which is the time required by the idle operational nodes 1222 running the second operational system to complete the second-type tasks.

In the steps S14, the control node 10 compares the estimated finish time of first-type task T1, the estimated finish time of second-type task T2, and the assigned finish time of operational task T0.

If the estimated finish time of first-type task T1 is greater than the assigned finish time of operational task T0, it means that the idle operational nodes 1220 running the first operational system in the computer cluster 1 is insufficient. The operations of the first-type tasks cannot be completed within the assigned finish time of operational task T0. At this moment, if the estimated finish time of second-type task T2 is less than the assigned finish time of operational task T0, it means that the idle operational nodes 1222 running the second operational system in the computer cluster 1 might be in excess. Thereby, as the estimated finish time of first-type task T1 is greater than the assigned finish time of operational task T0 and the estimated finish time of second-type task T2 is less than the assigned finish time of operational task T0, the step S151 is executed. In the step S151, the control node 10 controls the idle operational nodes 1222 running the second operational system to restart for changing them to run the first operational system.

Contrarily, if the estimated finish time of second-type task T2 is greater than the assigned finish time of operational task T0, it means that the idle operational nodes 1222 running the second operational system in the computer cluster 1 is insufficient. The operations of the second-type tasks cannot be completed within the assigned finish time of operational task T0. At this moment, if the estimated finish time of first-type task T1 is less than the assigned finish time of operational task T0, it means that the idle operational nodes 1220 running the first operational system in the computer cluster 1 might be in excess. Thereby, as the estimated finish time of second-type task T2 is greater than the assigned finish time of operational task T0 and the estimated finish time of first-type task T1 is less than the assigned finish time of operational task T0, the step S152 is executed. In the step S152, the control node 10 controls the idle operational nodes 1220 running the first operational system to restart for changing them to run the second operational system.

The system and method for dynamically adjusting operational environment according to the present invention set up the computer cluster 1 as described above and implement the steps S10 to S151/S152. The plurality of operational nodes 12 included in the computer cluster 1 have the first and second operational systems installed. Then the control node 10 controls the plurality of idle operational nodes 122 to restart for altering their operational system in operation, and thus adjusting the operational environment. Furthermore, the control node 10 estimates real-timely the estimated finish time of first-type task T1 for completing the first-type tasks and the estimated finish time of second-type task T2 for completing the second-type tasks. According to the relationship among the estimated finish time of first-type task T1, the estimated finish time of second-type task T2, and the assigned finish time of operational task T0, it is judged whether to restart the idle operational nodes 1220 running the first operational system or the idle operational nodes 1222 running the second operational system. Accordingly, the operational environment can be adjusted dynamically.

Please refer again to FIG. 1B. The method for dynamically adjusting operational environment according to the present invention can further comprise the following steps after the step S14:

Step S153: Assign the first-type tasks to the idle operational nodes running the first operational system, and assign the second-type tasks to the idle operational nodes running the second operational system; and
Step S154: Notify that the operational task cannot be completed within the assigned finish time of operational task.

According to the result of comparing the estimated finish time of first-type task T1, the estimated finish time of second-type task T2, and the assigned finish time of operational task T0, if the estimated finish time of first-type task T1 and the estimated finish time of second-type task T2 are both less than the assigned finish time of operational task T0, it means that all of the first-type tasks and the second-type tasks can be completed within the assigned finish time of operational task T0. Then the step S153 is executed. In the step S153, the control node 10 assigns the first-type tasks to the idle operational nodes 1220 running the first operational system and the second-type tasks to the idle operational nodes 1222 running the second operational system for facilitating subsequent utilization of the idle operational nodes 1220 running the first operational system for operating the first-type tasks and of the idle operational nodes 1222 running the second operational system for operating the second-type tasks.

Contrarily, if the estimated finish time of first-type task T1 and the estimated finish time of second-type task T2 are both greater than the assigned finish time of operational task T0, it means that the first-type tasks and the second-type tasks cannot be completed within the assigned finish time of operational task T0. In such a condition, even after adjusting the operational systems of the plurality of idle operational nodes 122, the first-type tasks and the second-type tasks still can not be completed within the assigned finish time of operational task T0. Thereby, the step S154 should be performed. In the step S154, the control node 10 notifies the user of inability of completing the operational task within the assigned finish time of operational task T0.

The method for dynamically adjusting operational environment according to the present invention sets up the computer cluster 1 as described above and implements the steps S153/S154. Accordingly, by judging if the estimated finish time of first-type task T1 and the estimated finish time of second-type task T2 estimated by the control node 10 are greater or less than the assigned finish time of operational task T0 concurrently, it is known whether the operational task 2 can be completed within the assigned finish time of operational task T0.

After the step S151 or S152, the steps S12 to S151/S152/S153/S154 should be performed again until reaching the step S153 or S154. While reaching the step S153, the first-type tasks and the second-type tasks can be completed within the assigned finish time of operational task T0. Then the target of completing the operational task 2 within the assigned finish time of operational task T0 can be achieved. Contrarily, while reaching the step S154, the first-type tasks and the second-type tasks cannot be completed within the assigned finish time of operational task T0. Then it is judged that the operational task 2 cannot be completed within the assigned finish time of operational task T0, and a notification should be submitted to the user.

Moreover, as shown in FIG. 1C, after the step S153 in FIG. 1B, the method for dynamically adjusting operational environment according to the present invention further comprises the following steps:

Step S16: The idle operational nodes running the first operational system operate the first-type tasks and the idle operational nodes running the second operational system operate the second-type tasks for producing the operational results; and Step S17: The storage node stores the operational results.

In the step S153 as described above, the control unit 10 has assigned the first-type tasks to the idle operational nodes 1220 running the first operational system and the second-type tasks to the idle operational nodes 1222 running the second operational system, respectively, according to the requirement in operational system by the first- and second-type tasks.

In the step S16, the idle operational nodes 1220 running the first operational system operate the first-type tasks and the idle operational nodes 1222 running the second operational system operate the second-type tasks. Thereby, a plurality of operational results are produced. The plurality of operational results can be transmitted to the storage node 14 by the idle operational nodes 1220 running the first operational system and the idle operational nodes 1222 running the second operational system.

In the step S17, the storage node 14 stores the plurality of operational results.

The method for dynamically adjusting operational environment according to the present invention sets up the computer cluster 1 as described above and implements the steps S153 to S17. Thereby, the idle operational nodes 1220 running the first operational system, which satisfy the system requirement for the first-type tasks, can be used for operating the first-type tasks; the idle operational nodes 1222 running the second operational system, which satisfy the system requirement for the second-type tasks, can be used for operating the second-type tasks. Then, the produced plurality of operational results are stored in the storage node 14.

Figure 2A:
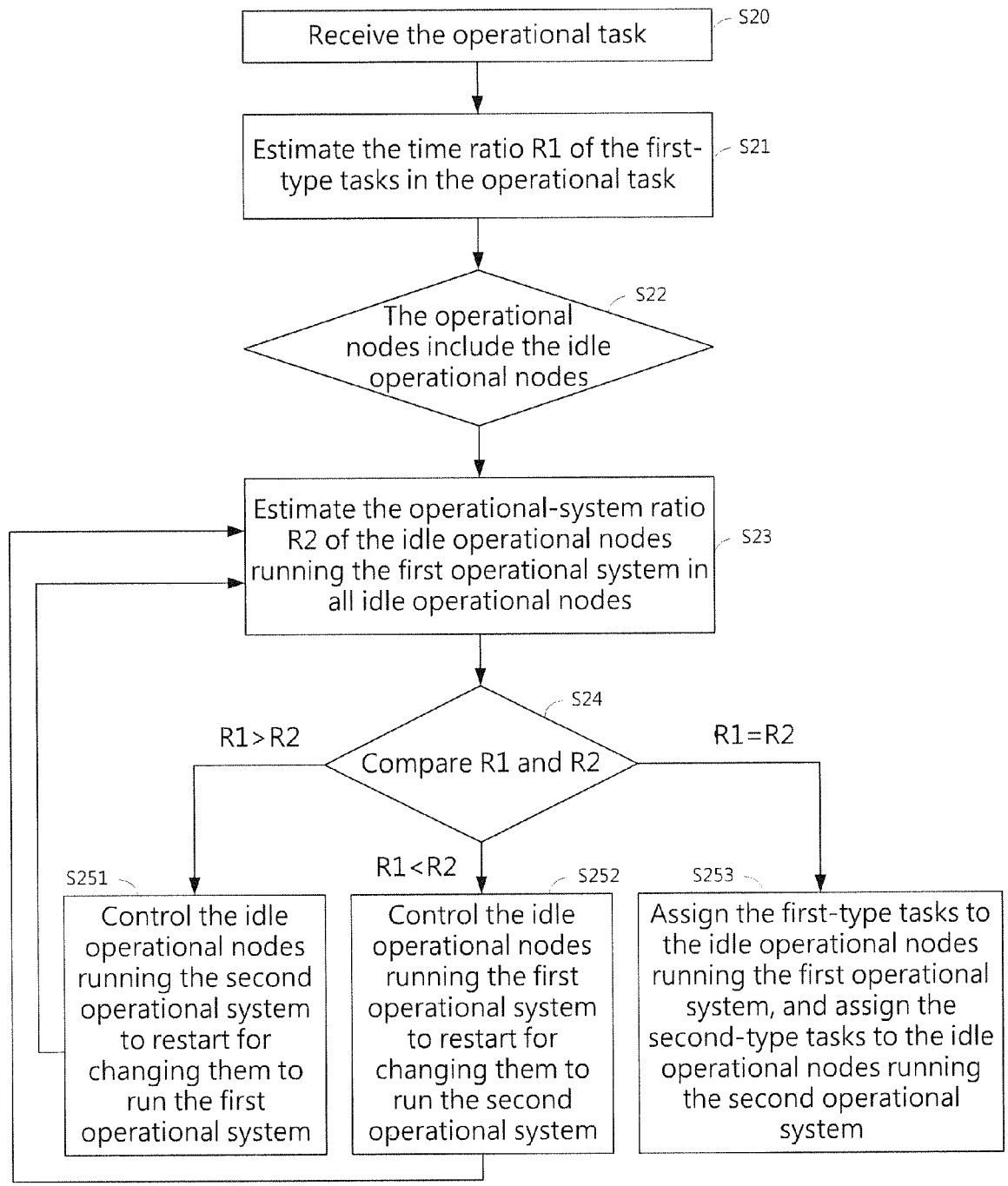
FIG. 2A shows a flowchart (1) of the method according to another preferred embodiment of the present invention.
Figure 2B:
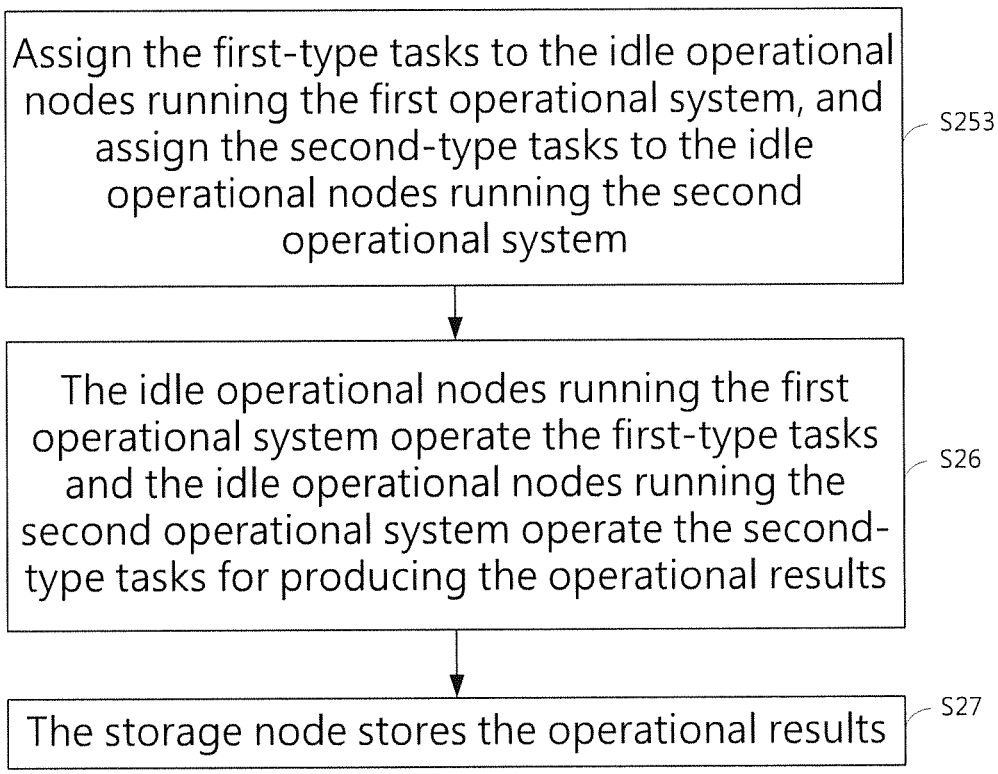
FIG. 2B shows a flowchart (2) of the method according to another preferred embodiment of the present invention.

With reference to FIG. 1A, please refer to FIG. 2A and FIG. 2B, which show flowcharts (1), (2) of the method according to another preferred embodiment of the present invention. As shown in FIG. 2A, the method for dynamically adjusting operational environment according to the present invention comprises the following main steps:

Step S20: Receive the operational task;

Step S21: Estimate the time ratio of the first-type tasks in the operational task;

Step S22: The operational nodes include the idle operational nodes;

Step S23: Estimate the operational-system ratio of the idle operational nodes running the first operational system in all idle operational nodes;

Step S24: Compare the time ratio and the operational-system ratio;

Step S251: Control the idle operational nodes running the second operational system to restart for changing them to run the first operational system; and Step S252: Control the idle operational nodes running the first operational system to restart for changing them to run the second operational system.

The step S20 is similar to the step S10, in which the control node 10 receives the operational task 2. Likewise, the operation task 2 includes the plurality of first-type tasks 20 operable in the first operational system and the plurality of second-type tasks 22 operable in the second operational system. Nonetheless, according to the present embodiment, it is not required to assign the assigned finish time of operational task T0 of the operational task 2.

In the step S21, the control node 10 estimates a time ratio R1 of the first-type tasks in the operational task 2. In other words, the time ratio R1 is the ratio of the time required to complete the first-type tasks using the operational nodes of identical number and running the operational system satisfying the requirement to the time required to complete the operational task 2.

The step S11 is similar to the step S11, in which the control node 10 confirms if all of the operational nodes 12 in the computer cluster 1 contain any idle operational node 122. If not, the control node 10 waits until at least an operation node 12 in the plurality of operational nodes 12 competes its operation, which is then released and becomes the idle operational node 122. When the plurality of operational node 12 contains at least an idle operational node 122, the step S23 is performed.

In the step S23, the control node 10 judges which of the first and second operational systems is operating in the idle operational node(s) 122. Then, an operational-system ratio R2 of the idle operational nodes 1220 running the first operational system in the plurality of idle operational nodes 122 is estimated.

In the step S24, the control node 10 compares the time ratio R1 and the operational-system ratio R2.

If the time ratio R1 is greater than the operational-system ratio R2, it means that the idle operational nodes 1220 running the first operational system in the computer cluster 1 is insufficient. As the idle nodes 1222 running the second operational system completes operations of the second-type tasks, the idle nodes 1220 running the first operational system cannot complete the operations of the first-type tasks. Then the step S251 should be executed. In the step, the control node 10 controls the idle operational nodes 1222 running the second operational system to restart for changing them to run the first operational system. Thereby, the number of the idle nodes 1220 running the first operational system can be increased.

Contrarily, if the time ratio R1 is less than the operational-system ratio R2, it means that the idle operational nodes 1220 running the first operational system in the computer cluster 1 is in excess. As the idle nodes 1220 running the first operational system completes operations of the first-type tasks, the idle nodes 1222 running the second operational system cannot complete the operations of the second-type tasks. Then the step S252 should be executed. In the step, the control node 10 controls the idle operational nodes 1220 running the first operational system to restart for changing them to run the second operational system. Thereby, the number of the idle nodes 1222 running the second operational system can be increased.

The system and method for dynamically adjusting operational environment according to the present invention sets up the computer cluster 1 as described above and implements the steps 620 to S251/S252. The plurality of operational nodes 12 contained in the computer cluster 1 install the first and the second operational systems. The control node 10 controls the plurality of idle operational nodes 122 to restart for changing their operational system. Then, the target of adjusting the operational environment can be achieved. In addition, the control node 10 estimates real-timely the time ratio R1 of the first-type tasks in the operational task and the operational-system ratio R2 of the idle nodes 1220 running the first operational system in the plurality of idle operational nodes 122. According to the relationship between the time ratio R1 and the operational-system ratio R2, it is judged whether to restart the idle operational nodes 1220 running the first operational system or the idle operational nodes 1222 running the second operational system. Thereby, the efficacy of dynamically adjusting the operational environment can be further achieved.

Please refer again to FIG. 2A. The method for dynamically adjusting operational environment according to the present invention can further comprise the following steps after the step S24:

Step S253: Assign the first-type tasks to the idle operational nodes running the first operational system, and assign the second-type tasks to the idle operational nodes running the second operational system.

In the step S24, the time ratio R1 and the operational-system ratio R2 are compared. If the time ratio R1 is equal to the operational-system ratio R2, it means that when the idle operational nodes 1220 running the first operational system complete the operations of the first-type tasks, the idle operational nodes 1222 running the second operational system cab also complete operations of the second-type tasks. Then the step 8253 is executed. In the step S253, the control node 10 assigns the first-type tasks to the idle operational nodes 1220 running the first operational system and the second-type tasks to the idle operational nodes 1222 running the second operational system for facilitating subsequent utilization of the idle operational nodes 1220 running the first operational system for operating the first-type tasks and of the idle operational nodes 1222 running the second operational system for operating the second-type tasks.

The method for dynamically adjusting operational environment according to the present invention sets up the computer cluster 1 as described above and implements the step S153. Accordingly, by judging if the time ratio R1, which is the time ratio of the first-type tasks in the operational task, and the operational-system ratio R2, which is the ratio of the idle operational nodes 1220 running the first operational system in the plurality of idle operational nodes 122, are equal, the control node 10 can determine if the subsequent steps, namely, assigning the first-type tasks to the idle operational nodes 1220 running the first operational system and the second-type tasks to the idle operational nodes 1222 running the second operational system, respectively, should be performed for further operations.

After the step S251 or S252, the steps S23 to S251/S252/S253 should be performed again until reaching the step S253. While reaching the step S253, the first-type tasks and the second-type tasks can be completed in the same time. Then the target of completing the operational task 2 in the shortest time can be thus achieved.

Moreover, as shown in FIG. 2B, the method for dynamically adjusting operational environment according to the present invention can further comprise the following steps after the step S253:

Step S26: The idle operational nodes running the first operational system operate the first-type tasks and the idle operational nodes running the second operational system operate the second-type tasks for producing the operational results; and Step S27: The storage node stores the operational results.

The steps S26, S27 are the same as the steps S16, S17. Please refer to the related description in the previous embodiment. The details will not be repeated again.

To sum up, the present invention provides an operational-task-oriented system and method for dynamically adjusting operational environment. The plurality of operational nodes 12 contained in the computer cluster 1 have the first and second operational systems installed. The control node 10 controls the plurality of idle operational nodes 122 to restart for altering their operational systems on duty, and thus achieving the purpose of adjusting the operational environment. In addition, the control node 10 can estimate real-timely the estimated finished of first-type task T1 and the estimated finish time of second-type task T2, which are compared with the assigned finish time of operational task T0 for judging whether the idle operational nodes 1220 running the first operational system or the idle operational nodes 1222 running the second operational system should be restarted. Alternatively, the time ratio R1 of the first-type tasks in the operational task and the real-timely estimated operational-system ratio R2 of the idle operational node 1220 running the first operational system in the plurality of idle operational nodes 122 are compared for judging whether the idle operational nodes 1220 running the first operational system or the idle operational nodes 1222 running the second operational system should be restarted. Thereby, the efficacy of dynamically adjusting the operational environment can be achieved.

Accordingly, the present invention conforms to the legal requirements owing to its novelty, nonobviousness, and utility. However, the foregoing description is only embodiments of the present invention. not used to limit the scope and range of the present invention. Those equivalent changes or modifications made according to the shape, structure, feature, or spirit described in the claims of the present invention are included in the appended claims of the present invention.

The invention claimed is:

1. A method for dynamically adjusting operational environment, applicable to a computer cluster, each of a plurality of operational nodes of said computer cluster installing a first operational system and a second operational system, and comprising steps of:
   a control node receiving an operational task including at least a first-type task and at least a second-type task, said first-type task being operated in said first operational system, and said second-type task being operated in said second operational system;
   when said plurality of operational nodes includes at least an idle operational node not performing operation, said control node judging whether said idle operational node operates in said first operational system or said second operational system;
   said control nodes estimating an estimated finish time of first-type task for operating said first-type task by said idle operational node running said first operational system and an estimated finish time of second-type task for operating said second-type task by said idle operational node running said second operational system;
   said control node comparing said estimated finish time of first-type task, said estimated finish time of second-type task, and an assigned finish time of operational task;
   when said estimated finish time of first-type task is greater than said assigned finish time of operational task and said estimated finish time of second-type task is less than said assigned finish time of operational task, said control node assigns at least an idle node running said second operational system to said first-type task by restarting and altering the operational system of said idle operational node to said first operational system; and
   when said estimated finish time of second-type task is greater than said assigned finish time of operational task and said estimated finish time of first-type task is less than said assigned finish time of operational task, said control node assigns at least an idle node running said first operational system to said second-type task by restarting and altering the operational system of said idle operational node to said second operational system.

2. The method for dynamically adjusting operational environment of claim 1, and after said step of said control node comparing said estimated finish time of first-type task, said estimated finish time of second-type task, and an assigned finish time of operational task, further comprising a step of when said estimated finish time of first-type task is less than said assigned finish time of operational task and said estimated finish time of second-type task is less than said assigned finish time of operational task, said control node assigning said first-type task to said idle operational node running said first operational system and said second-type task to said idle operational node running said second operational system.

3. The method for dynamically adjusting operational environment of claim 2, and after said step of said control node assigning said first-type task to said idle operational node running said first operational system and said second-type task to said idle operational node running said second operational system, further comprising a step of said idle operational node running said first operational system operating said first-type task and said idle operational node running said second operational system operating said second-type task for producing a plurality of operational results.

4. The method for dynamically adjusting operational environment of claim 3, and after said step of said idle operational node running said first operational system operating said first-type task and said idle operational node running said second operational system operating said second-type task for producing a plurality of operational results, further comprising a step of a storage node storing said plurality of operational results.

5. The method for dynamically adjusting operational environment of claim 1, and after said step of said control node comparing said estimated finish time of first-type task, said estimated finish time of second-type task, and an assigned finish time of operational task, further comprising a step of when said estimated finish time of first-type task is greater than said assigned finish time of operational task and said estimated finish time of second-type task is greater than said assigned finish time of operational task, said control node notifying that said operational task cannot be completed within said assigned finish time of operational task.

6. A method for dynamically adjusting operational environment, applicable to a computer cluster, each of a plurality of operational nodes of said computer cluster installing a first operational system and a second operational system, and comprising steps of:
   a control node receiving an operational task including at least a first-type task and at least a second-type task, said first-type task being operated in said first operational system, and said second-type task being operated in said second operational system;
   said control node estimating a time ratio of said first-type task in said operational task;
   when said plurality of operational nodes include a plurality of idle operational nodes not performing operation, said control node estimating an operational-system ratio of at least an idle operational node running said first operational system in said plurality of idle operational nodes;
   said control node comparing said time ratio and said operational-system ratio;
   when said time ratio is greater than said operational-system ratio, said control node assigns at least an idle node running said second operational system to said first-type task by restarting and altering the operational system of said idle operational node to said first operational system; and
   when said time ratio is less than said operational-system ratio, said control node assigns at least an idle node running said first operational system to said second-type task by restarting and altering the operational system of said idle operational node to said second operational system.

7. The method for dynamically adjusting operational environment of claim 6, and after said step of said control node estimating said operational-system ratio of at least an idle operational node running said first operational system in said plurality of idle operational nodes, further comprising a step of when said time ratio is equal to said operational-system ratio, said control node assigning said first-type task to said idle operational node running said first operational system and said second-type task to said idle operational node running said second operational system.

8. The method for dynamically adjusting operational environment of claim 7, and after said step of said control node assigning said first-type task to said idle operational node running said first operational system and said second-type task to said idle operational node running said second operational system, further comprising a step of said idle operational node running said first operational system operating said first-type task and said idle operational node running said second operational system operating said second-type task for producing a plurality of operational results.

9. The method for dynamically adjusting operational environment of claim 8, and after said step of said idle operational node running said first operational system operating said first-type task and said idle operational node running said second operational system operating said second-type task for producing a plurality of operational results, further comprising a step of a storage node storing said plurality of operational results.

* * * * *